(12) United States Patent
Bahdanau

(10) Patent No.: US 12,243,518 B2
(45) Date of Patent: Mar. 4, 2025

(54) DATA AUGMENTATION FOR INTENT CLASSIFICATION

(71) Applicant: ServiceNow, Inc., Santa Clara, CA (US)

(72) Inventor: Dzmitry Bahdanau, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 310 days.

(21) Appl. No.: 17/978,690

(22) Filed: Nov. 1, 2022

(65) Prior Publication Data
US 2023/0141398 A1    May 11, 2023

Related U.S. Application Data

(60) Provisional application No. 63/263,929, filed on Nov. 11, 2021.

(51) Int. Cl.
*G10L 15/18* (2013.01)
*G10L 15/06* (2013.01)

(52) U.S. Cl.
CPC ........ *G10L 15/1815* (2013.01); *G10L 15/063* (2013.01); *G10L 2015/0631* (2013.01)

(58) Field of Classification Search
CPC .............. G10L 15/1815; G10L 15/063; G10L 2015/0631
USPC .......................................... 704/231, 239, 251
See application file for complete search history.

(56) References Cited

U.S. PATENT DOCUMENTS

| | | |
|---|---|---|
| 6,609,122 B1 | 8/2003 | Ensor |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |

(Continued)

OTHER PUBLICATIONS

Kumar et al., "A Closer Look At Feature Space Data Augmentation For Few-Shot Intent Classification," Nov. 3, 2019, Proceedings of the 2nd Workshop on Deep Learning Approaches for Low-Resource NLP (DeepLo), 10 Pages.

(Continued)

*Primary Examiner* — George C Monikang
(74) *Attorney, Agent, or Firm* — FLETCHER YODER PC

(57) ABSTRACT

The present disclosure relates to a data augmentation system and method that uses a large pre-trained encoder language model to generate new, useful intent samples from existing intent samples without fine-tuning. In certain embodiments, for a given class (intent), a limited number of sample utterances of a seed intent classification dataset may be concatenated and provided as input to the encoder language model, which may generate new sample utterances for the given class (intent). Additionally, when the augmented dataset is used to fine-tune an encoder language model of an intent classifier, this technique improves the performance of the intent classifier.

20 Claims, 5 Drawing Sheets

(56) References Cited

U.S. PATENT DOCUMENTS

| | | |
|---|---|---|
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Meuller |
| 8,887,133 B2 | 11/2014 | Behnia |
| 9,098,322 B2 | 8/2015 | Apte |
| 9,239,857 B2 | 1/2016 | Trinon |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 2022/0414344 A1* | 12/2022 | Makki Niri ............. G06F 40/30 |

OTHER PUBLICATIONS

Lee et al., "Neural Data Augmentation via Example Extrapolation," Feb. 2, 2021, https://doi.org/10.48550/arXiv.2102.01335, 14 pages.

Sahu et al., "Data Augmentation for Intent Classification with Off-the-shelf Large Language Models," May 27, 2022, Proceedings of the 4th Workshop on NLP for Conversational AI, pp. 47-57.

Kumar et al., "Data Augmentation Using Pre-trained Transformer Models," Janaury 31, 2021, https://doi.org/10.48550/arXiv.2003.02245, 9 Pages.

* cited by examiner

DATA AUGMENTATION FOR INTENT CLASSIFICATION

CROSS-REFERENCE TO RELATED APPLICATIONS

This application claims priority to and benefit of Provisional Application No. 63/263,929, entitled "DATA AUGMENTATION FOR INTENT CLASSIFICATION," and filed on Nov. 11, 2021, which is herein incorporated by reference in its entirety for all purposes.

BACKGROUND

The present disclosure relates generally to natural language understanding (NLU) and, more specifically, to augmenting data for training of intent classifiers for NLU applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Certain cloud computing services may provide natural language understanding (NLU) interfaces using virtual assistants or conversational agents that interact with users via natural language exchanges. These natural language exchanges may include, for example, written natural language utterances exchanged as messages between a user and a virtual assistant in a chat room-based conversational medium, or spoken natural language utterances exchanged verbally between a user and a virtual assistance in a phone-based conversational medium. For such virtual assistants, determining the intent of received user communications (referred to as "intent classification") is both important and challenging. Intent classification is generally performed using a machine-learning (ML) or artificial intelligence (AI)-based intent classifier (e.g., an encoder language model) that is trained or fine-tuned using task-specific data (e.g., an intent classification dataset) in order to then be able to classify the intents of received user utterances. The intent classification dataset generally includes a set of utterances with labeled intents, and intent labeling is often manually performed by a human. As such, it can be cumbersome and expensive to generate large intent classification datasets. Furthermore, when the intent classification dataset lacks a sufficient number of intent samples, then the intent classifier can struggle to correctly classify intents of received user utterances, and the virtual assistant may not be able to successfully fulfill natural language requests of users.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As set forth above, it can be challenging to construct an intent classification dataset having a sufficient number of intent samples to train an encoder language model of an intent classifier to adequately classify intents of natural language requests received from users. Present embodiments are directed to a data augmentation system and method for augmenting an initial intent classification dataset into a sufficiently large and well-developed intent classification dataset for training and/or fine-tuning of an intent classifier. More specifically, present embodiments are directed to using a large, pre-trained autoregressive generative language model without fine-tuning (e.g., the third generation generative pre-trained transformer, GPT-3, available from OPENAI) to augment the intent classification dataset into a sufficiently developed dataset for training of the intent classifier. As used herein, the term "fine-tuning" with respect to the pre-trained autoregressive generative language model refers to an iterative adjustment of the parameters (e.g., weights) of the model after training based on a test dataset that is specialized or particular to a particular domain associated with a virtual assistant (e.g., a test dataset including examples of utterances the virtual assistant might receive during operation).

In contrast, present embodiments employ the pre-trained autoregressive generative language model that has only been trained on a general dataset (e.g., encyclopedias, websites, knowledge bases) that is not specialized or particular to the domain associated with the virtual assistant, and this model is used without performing fine-tuning. It is presently recognized that fine-tuning of an autoregressive generative language model typically requires a large training dataset. Like the intent classification dataset, the training dataset for fine-tuning an autoregressive generative language model would include a large collection of intent samples. However, for situations in which the initial intent classification dataset is especially limited or scarce, such a large training dataset would likely not be available to fine-tune an autoregressive generative language model. Additionally, it is also presently recognized that fine-tuning can undesirably cause the autoregressive generative language model to lose generality as the model can become "overfit" to the sample utterances of the training dataset during fine-tuning. As such, by avoiding fine-tuning, the disclosed data augmentation system and method enables augmentation using only a limited amount of training data (e.g., intent samples), while also ensuring that the autoregressive generative language model maintains a desirable level of generality.

The disclosed data augmentation technique generally involves providing portions of the initial or seed intent classification dataset as input to the autoregressive generative language model, and allowing the autoregressive generative language model to generate new intent samples that are alternative expressions of each intent. For example, in certain embodiments, a set of sample utterances representing a particular intent within the initial intent classification dataset may be concatenated and provided as input to the autoregressive generative language model (referred to herein as "single intent prompting") to generate new sample utterances that can be used, along with the original sample utterances of the seed intent classification dataset, to train an intent classifier with respect to the particular intent. In some embodiments, a set of sample utterances representing multiple intents within the seed intent classification dataset may be concatenated and provided as input to the autoregressive generative language model (referred to herein as "multiple intent prompting") to generate new sample utterances that can be used, along with the original sample utterances of the seed intent classification dataset, to train an intent classifier with respect to the multiple or mixed intents.

In certain embodiments, such as when the generated sample utterances are too noisy or when multiple intent prompting is used, the newly generated sample utterances may be manually evaluated and/or modified (e.g., revised, relabeled, removed) by a human reviewer before being added to augment the intent classification dataset. For such embodiments, the system may include a suitable ML-based component (e.g., an active learning algorithm) that is trained to identify which of the newly generated sample utterances should be flagged for manual review to provide the greatest benefit to the performance of the intent classifier. Furthermore, in certain embodiments, one or more of the newly generated sample utterances are provided again as input to the autoregressive generative language model to continue the generation of additional new sample utterances to augment the intent classification dataset. As such, using a seed intent classification dataset having only a few sample utterances per intent, the disclosed data augmentation system and method enable the generation of a sufficiently developed intent classification dataset for fine-tuning of the encoder language model of an intent classifier, which enables improved performance for the virtual assistant when classifying intents of received natural language requests.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
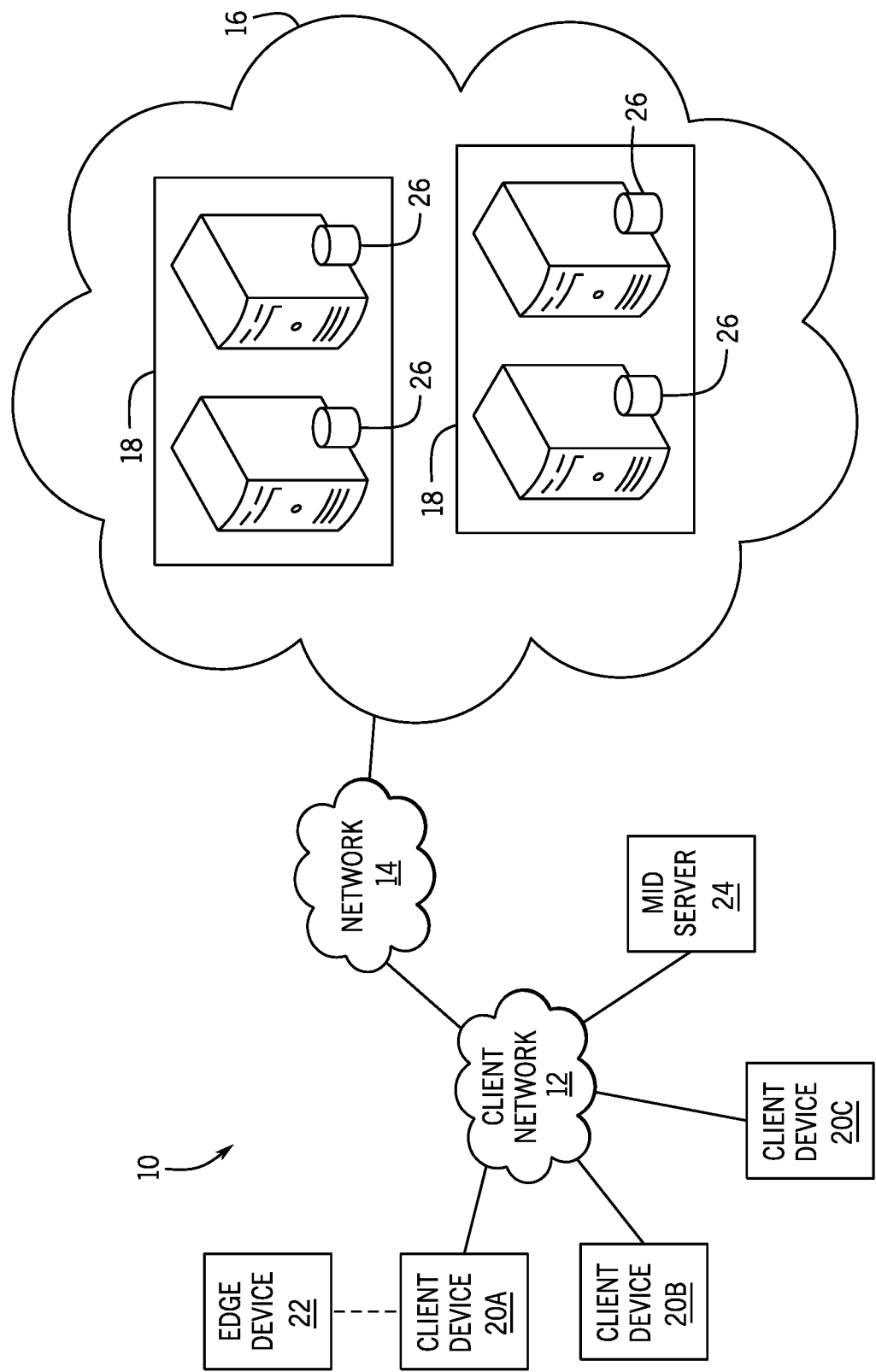
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As set forth above, data scarcity is a challenge for intent classification datasets. Data augmentation alleviates the problem of data scarcity when training language models (LMs) by generating new examples based on the existing data. One approach involves generating new samples using a pre-trained autoregressive generative language model that has been fine-tuned using a large quantity of task-specific data in the form of intent samples. However, it is presently recognized that fine-tuning of the trained autoregressive generative language model may not be possible when such task-specific data is scarce. Additionally, it is presently recognized that there are also certain disadvantages to fine-tuning, such as a loss of generality within the autoregressive generative language model.

With this in mind, present embodiments are directed to a data augmentation system and method that uses a large pre-trained encoder language model to generate new, useful intent samples from existing intent samples without fine-tuning. For example, in certain embodiments, for a given class (intent), a limited number of sample utterances of a seed intent classification dataset may be concatenated and provided as input to the encoder language model, which may generate new sample utterances for the given class (intent). Additionally, when the augmented dataset is used to fine-tune an encoder language model of an intent classifier, this technique improves the performance of the intent classifier, especially for few-shot intent classification. Furthermore, despite using substantially less task-specific data, the disclosed data augmentation technique unexpectedly offers superior performance compared to sampling from a fine-tuned autoregressive generative language model.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
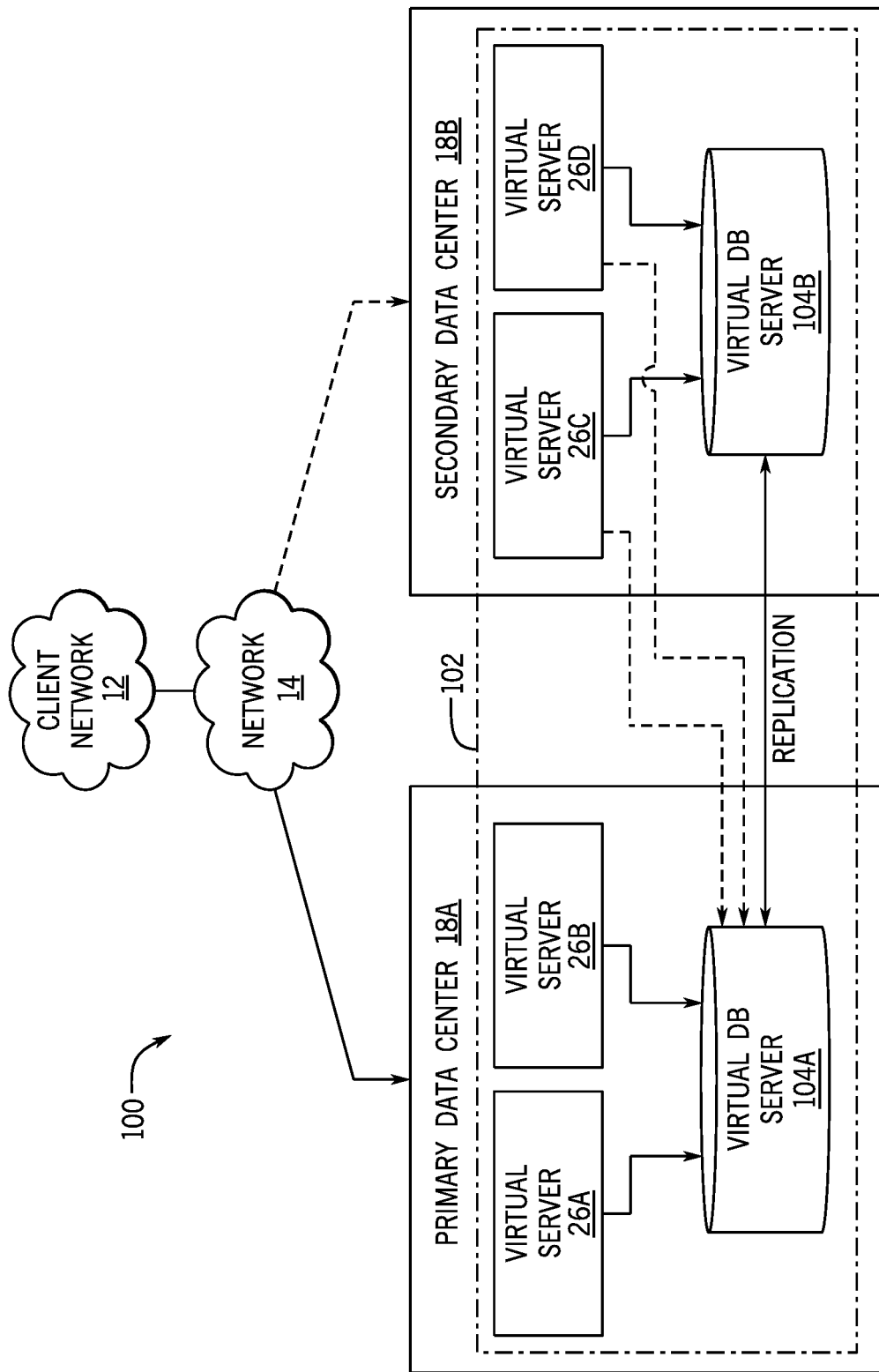
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
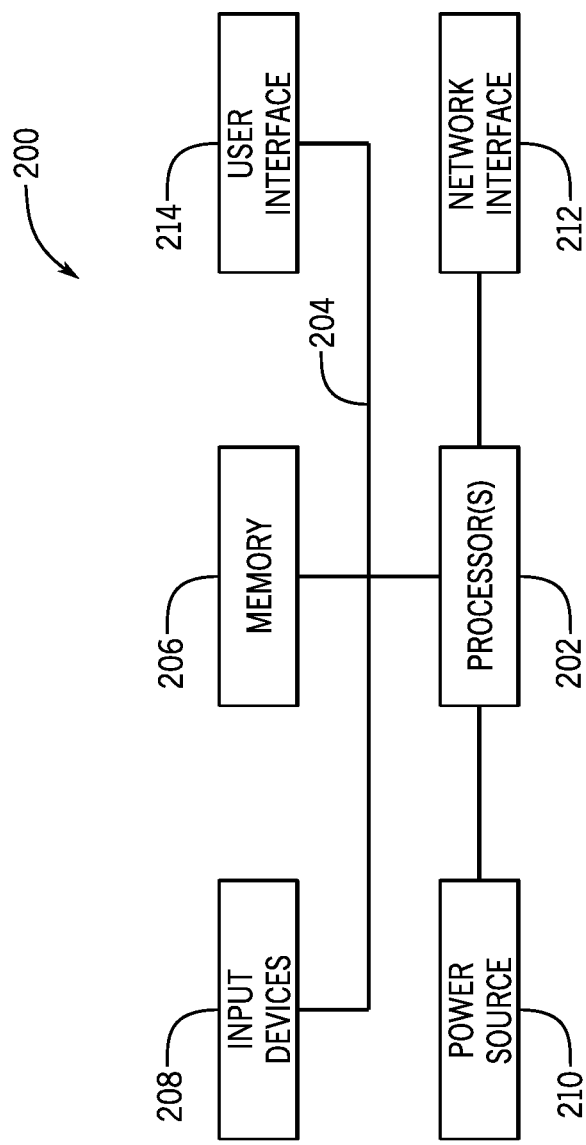
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
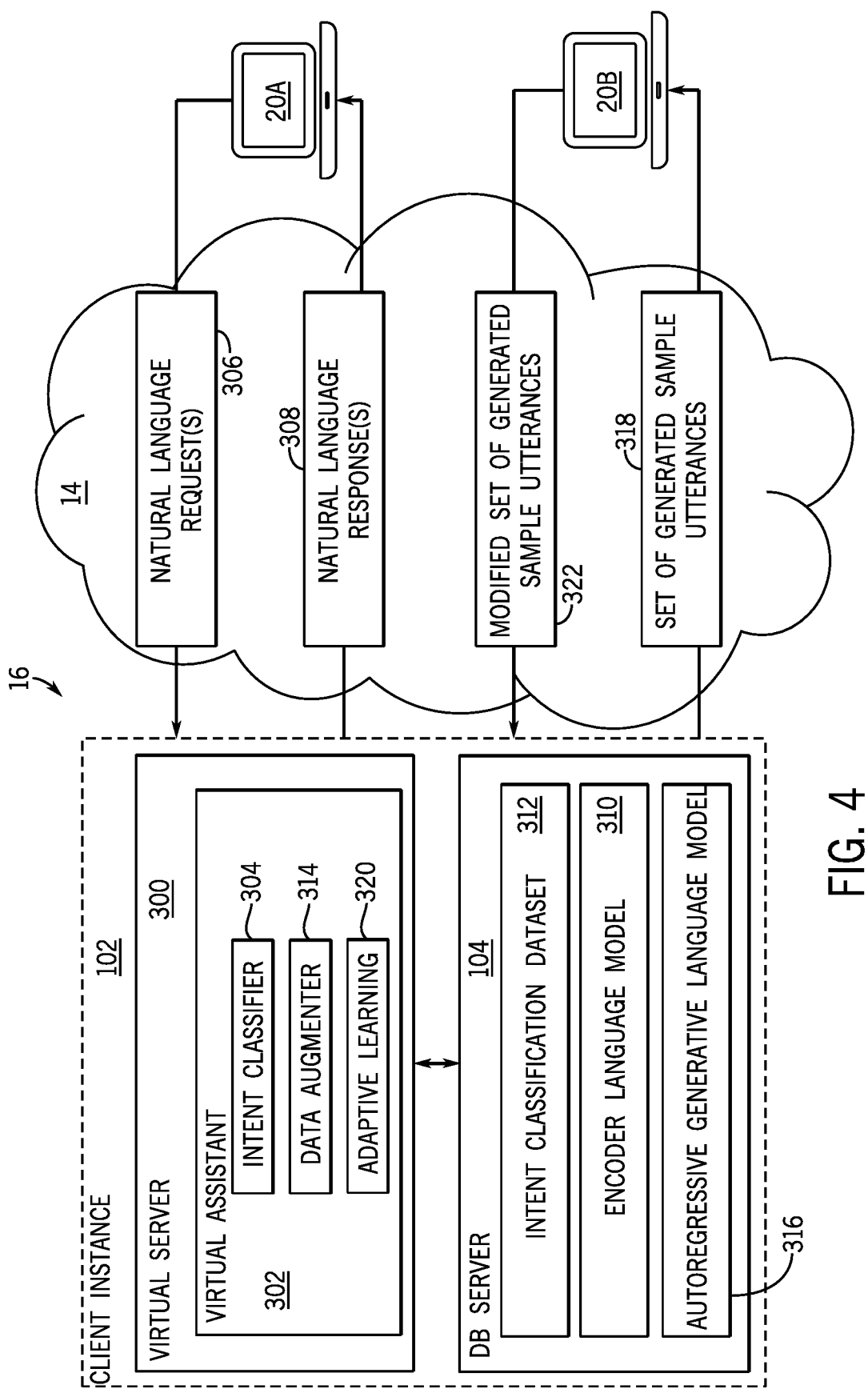
FIG. 4 is a block diagram illustrating an embodiment in which a virtual server supports and enables a virtual assistant of a client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20A and 20B, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser. Additionally, as mentioned above, the client instance 102 includes a DB server 104 that stores information related to the client instance (e.g., client data, applications, models, datasets).

More specifically, for the illustrated embodiment, the virtual server 300 hosts a virtual assistant 302 that is designed to enable natural language interactions (e.g., natural language exchanges, natural language conversations) with users. The virtual assistant 302 includes an intent classifier 304 that is generally configured to receive natural language requests 306 from a user of the client device 20A, classify one or more intents of the natural language requests 306, and take appropriate actions to fulfill the request (e.g., change a password, create a new user, create an incident report). In certain situations, the actions may include providing natural language responses 308 to the user of the client device 20A, for example, confirming the requested action or confirming completion of the requested action.

In order to classify intents of incoming natural language requests, the intent classifier 304 of the virtual assistant 302 is associated with an encoder language model 310, which is stored by the DB server 104 in the illustrated embodiment. The encoder language model 310 is a pre-trained encoder language model, such as Bidirectional Encoder Representations from Transformers (BERT), that has been fine-tuned using an intent classification dataset 312, which is also stored by the DB server in the illustrated embodiment. Each of the entries in the intent classification dataset 312 includes a sample utterance having one or more labeled intents (also referred to herein as "intent samples").

However, as noted above, it can be challenging to create an intent classification dataset 312 having a sufficient number of intent samples to adequately fine-tune the encoder language model 310 of the intent classifier 304 to properly classify intents of received natural language requests 306. As such, the virtual assistant 302 includes a data augmenter 314 that is associated with a pre-trained autoregressive generative language model 316, such as GPT-3, which is also stored by the DB server 104 in the illustrated embodiment. Additionally, the autoregressive generative language model 316 is not fine-tuned based on a particular dataset to specifically generate intent samples. Rather, the autoregressive generative language model 316 is used as-is, after only pre-training, which is advantageous for situations in which a dearth of intent samples imposes a barrier to fine-tuning and/or situations in which the generality of the model might be compromised by fine-tuning.

The data augmenter 314 generally applies the autoregressive generative language model 316 to generate additional intent samples from intent samples already present within the intent classification dataset 312. For example, the intent classification dataset 312 may initially include only a few (e.g., 3 to 5) sample utterances per intent, wherein these initial samples may be manually created by human users. As discussed below, the data augmenter 314 is designed to combine the sample utterances of one or more intents, and then to provide this combination of sample utterances as input to the autoregressive generative language model 316. In response, the autoregressive generative language model 316 generates and outputs a set of new sample utterances 318.

In certain embodiments, the data augmenter 314 may proceed to augment the intent classification dataset 312 by adding the generated sample utterances 318 to the dataset without human review and/or revision, which improves efficiency and reduces the cost of augmenting the intent classification dataset 312. In other embodiments, the data augmenter 314 may first provide the set of generated sample utterances 318 to a user of client device 20B for review and/or modification. For such embodiments, the virtual assistant 302 may include an adaptive learning component 320 (e.g., an adaptive learning algorithm or function) that is trained to identify which of the set of generated sample utterances 318 should be flagged for review and/or modification (e.g., relabeling) by the reviewer. For example, the adaptive learning component 320 may be trained to identify high-value sample utterances and/or sample utterances that are likely to include errors (e.g., be mislabeled, include grammatical issues). For such embodiments, once the reviewer has removed low-quality (e.g., noisy) sample utterances and/or modified (e.g., revised, relabeled) the set of generated sample utterances 318, the modified set of generated sample utterances 322 may be returned to the data augmenter 314 of the virtual assistant 302, which adds at least a portion of these intent samples to the intent classification dataset 312 to augment the dataset. Subsequently, the data augmenter 314 (or another suitable component of the virtual assistant 302, the virtual server 300, or the client instance 102) may use this augmented intent classification dataset 312 to fine-tune the encoder language model 310 of the intent classifier 304 to improve the performance of the intent classifier 304 when classifying intents of received natural language requests 306.

Figure 5:
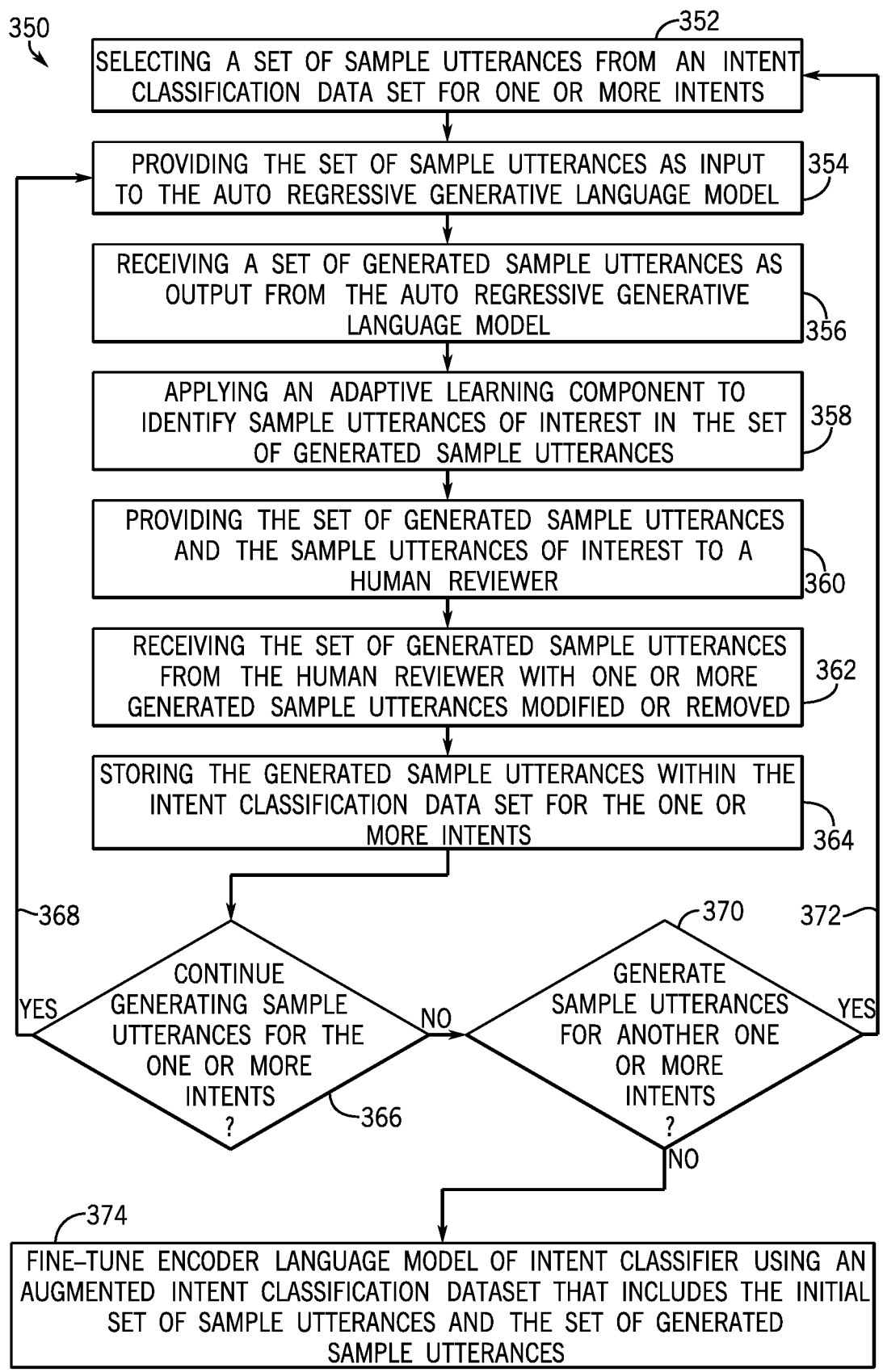
FIG. 5 is a flow diagram illustrating an embodiment of a process by which a data augmenter of the virtual assistant uses an autoregressive generative language model to augment an intent classification dataset, before the augmented intent classification dataset is used to train an encoder language model of an intent classifier of the virtual assistant, in accordance with aspects of the present disclosure.

FIG. 5 is a flow diagram illustrating an embodiment of a process 350 by which a data augmenter 314 of the virtual assistant 302 uses the autoregressive generative language model 316 to augment the intent classification dataset 312, before the augmented intent classification dataset is used to train the encoder language model 310 of the intent classifier 304 of the virtual assistant 302. The process 350 is discussed with reference to elements illustrated in FIG. 4. The process 350 is merely provided as an example, and in other embodiments, the process 350 may include additional steps, omitted steps, repeated steps, and so forth, in accordance with the present disclosure. In certain embodiments, the process 350 may be implemented as stored software instructions that are stored in a suitable memory and executed by a suitable processor associated with the client instance 102, or another computing system.

In certain embodiments, the process 350 may be performed to augment an initial or seed intent classification dataset 312 that only includes a limited number of sample utterances for each intent (e.g., a manually-created or human-authored seed dataset). In other embodiments, the process 350 may be performed on a previously-augmented or larger intent classification dataset 312 to further augment the dataset (e.g., to generate multi-intent samples for and from an existing dataset that only includes single-intent samples). In some embodiments, the process 350 may be performed in response to a request to augment one or more particular intents of, or the entirety of, the intent classification dataset 312. In some embodiments, the process 350 may automatically be performed in response to new intents being added to the intent classification dataset 312, in response to detecting intents in the intent classification dataset 312 having less than a predetermined number of corresponding intent samples, or based on a periodic or predetermined schedule.

For the embodiment illustrated in FIG. 5, the process 350 begins with the data augmenter 314 selecting (block 352) a set of sample utterances from the intent classification dataset 312 for one or more intents to be augmented. In certain embodiments, the process 350 may be configured (e.g., based on configuration files or received inputs) to either generate single-intent samples for a specific intent via single-intent prompting of the autoregressive generative language model 316, or to generate multi-intent samples for more than one intent via multi-intent prompting of the autoregressive generative language model 316. For embodiments with single-intent prompting, the data augmenter 314 may concatenate the sample utterances of a single intent of the intent classification dataset 312 into a suitably delineated string that is then provided (block 354) as input to the autoregressive generative language model 316. For embodiments with multi-intent prompting, the data augmenter 314 may concatenate the sample utterances of multiple intents of the intent classification dataset 312 into a suitably delineated string that is then provided (block 354) as input to the autoregressive generative language model 316. Subsequently, the data augmenter 314 receives (block 356) a set of generated sample utterances 318 as the output of the autoregressive generative language model 316.

As noted above, in certain embodiments, the data augmenter 314 may optionally employ a human reviewer to evaluate and/or modify the set of generated sample utterances 318, while in other embodiments, these steps may be skipped. For certain embodiments involving human review, the data augmenter 314 may apply (block 358) the adaptive learning component 320 to identify and flag sample utterances of the set 318 that may be of particular interest to the human reviewer. The data augmenter 314 may provide (block 360) the set of generated sample utterances 318 to the human reviewer (e.g., via a suitable client device 20). In certain embodiments, the data augmenter 314 may generate and provide a graphical user interface (GUI) having suitable graphical user interface elements to enable the human reviewer to review, remove, modify, and/or relabel one or more of the generated intent samples. Subsequently, the data augmenter 314 receives (block 362) the modified set of generated sample utterances 322 from the client device 20 of the human reviewer based on inputs provided by the human reviewer. In certain embodiments, the human reviewer may be omitted, and steps 358, 360, and 362 may be skipped, which enables the data augmentation of the process 350 to be mostly or entirely automated.

For the embodiment illustrated in FIG. 5, the process 350 continues with the data augmenter 314 storing (block 364) the set of generated sample utterances 318 (or the modified set of generated sample utterances 322) within the intent classification dataset 312 for the one or more intents. For embodiments with multi-intent prompting, the resulting multi-intent samples may be stored as sample utterances for any one of the component intents or for all of the component intents. In certain embodiments, only a portion of the generated sample utterances are stored within the intent classification dataset 312. For example, in certain embodiments, a number of sample utterances may be selected for inclusion or culled based on a respective score determined for each generated sample utterance by the adaptive learning component 320. By way of particular example, this score may be based on a uniqueness of a generated sample utterance relative to other generated sample utterances, as well as sample utterances already present within the intent classification dataset 312 for the intent, which encourages diversity and breadth within the dataset. In other embodiments, this score may be based on other factors, such as how well the generated sample utterances adhere to grammar rules of the language, a number of unique entities in each generated sample utterance, or other suitable factors. As such, in certain embodiments, the data augmenter 314 may be capable of automatically selecting and/or culling at least a portion of the generated sample utterances based on such factors before augmenting the intent classification dataset 312.

For the embodiment illustrated in FIG. 5, the process 350 continues with the data augmenter 314 determining (decision block 366) whether to continue generating sample utterances for the one or more intents. For example, in certain embodiments, a threshold configuration value may define how many sample utterances are desired for each intent, and the data augmenter 314 may continue generating intent samples for the one or more intents until this threshold value is reached. When the data augmenter 314 determines that intent sample generation should continue for the one or more intents, the data augmenter 314 concatenates the generated sample utterances into a suitably delineated string that is provided (block 354) as input to the autoregressive generative language model 316, as indicated by the arrow 368, such that the model can continue generating additional new sample utterances from the previously generated sample utterances.

When, in decision block 366, the data augmenter 314 determines that no further intent samples should be generated for the current one or more intents, the data augmenter 314 then determines (decision block 370) whether to generate intent samples for another one or more intents of the intent classification dataset 312. For example, when the process 350 is executed to augment several or all of the intents of the intent classification dataset 312, then the data augmenter 314 selects a set of sample utterances from the intent classification dataset 312 for the next one or more intents to be augmented, as indicated by the arrow 372. As such, the process 350 continues until all of the requested intents have been augmented within the intent classification dataset 312.

For the embodiment illustrated in FIG. 5, the process 350 concludes with the data augmenter 314 (or another suitable component of the virtual assistant 302, virtual server 300, or client instance 102) fine-tuning (block 374) the encoder language model 310 of the intent classifier 304 using the augmented intent classification dataset 312, which includes the original sample utterances, as well as the generated sample utterances produced by the autoregressive generative language model 316. Once fine-tuned using the augmented intent classification dataset 312, the encoder language model 310 of the intent classifier 304 demonstrates improved performance in terms of accuracy, precision, and/or recall as compared to the encoder language model 310 fine-tuned with only the original intent classification dataset 312 without augmentation.

The example below demonstrates the improvement enabled by the present approach using a publically-available intent classification dataset known as CLINC150. CLINC150 includes 23,700 task-oriented queries covering 10 domains with 15 different intents per domain. From these queries, 1200 belong to an out-of-scope (OOS) class in the CLINC150 dataset. The CLINC150 dataset is balanced and includes: 100 training queries per intent, 20 queries that belong to an in-scope class (and 100 queries that belong to an OOS class) for validation, and 30 queries that belong to an in-scope class (and 1000 that belong to an OOS class) for testing. For the CLINC150 dataset, the few-shot sets correspond to each of the 10 domains.

As discussed below, to provide baselines for comparison to the present embodiments in this example, a portion of the training queries of the CLINC150 dataset was used without augmentation to fine-tune a BERT-large encoder language model, and the performance of the fine-tuned model to correctly classify intents was then evaluated using the validation and/or test data of the CLINC150 dataset. For present embodiments, the set of training queries of the CLINC150 dataset was artificially truncated to simulate intent sample scarcity, and then these training queries were augmented using the techniques set forth herein. The augmented set of training queries was then used to fine-tune a BERT-large encoder language model, and the performance of the fine-tuned model to correctly classify intents was then evaluated using the validation and/or test data of the CLINC150 dataset. The BERT-large language models were generally trained or fine-tuned using the standard procedure for training a linear classifier on top of the classification (CLS) token.

Example: Test Setup

For this example, a few-shot learning setup was employed. The CLINC150 intent classification dataset 312 includes sample utterances (intent samples) that each include a text and class pair: $e=(x, y)$, where $x \in X$ and $y \in Y$ In the few-shot scenario, only K samples are available per class (intent). All the classes in a few-shot domain were truncated to K=10 samples per class. Instead of truncating the whole dataset to K samples per class, a cross-validation scheme was used. Therefore, an experiment was run for each classy $y_i$, with $i \in 1 \ldots |Y|$. For each experiment, each class was artificially truncated by randomly sampling K examples from that class. The truncated set was denoted as the few-shot set $D_F$, and the rest of the intent samples were denoted as being part of the many-shot set $D_M$. The intent classification models were trained on $D_F \cup D_M$ and evaluated with the original development and test sets.

Example: Augmentation Procedure

Given a few-shot set $D_F$ with K samples of the same class, the autoregressive generative language model 316 of the data augmenter 314 produced N new sample utterances from the same class (same intent) to compensate for the small size of K. To do so, N new sample utterances were generated using a particular GPT-3 model (e.g., Ada, Babbage, Curie, or Davinci) without fine-tuning, to obtain $D_F$. In order to condition GPT-3 on $D_F$, K sample utterances were concatenated as a new-line-delimited sequence that was provided as input to GPT-3, and sample N new sample utterances were collected from the GPT-3 output, where N is the median number of samples per class in the dataset. Then, these N new sample utterances were used to augment the original set of K sample utterances to yield $\tilde{D}=D_F \cup \tilde{D}_F$, which included K+N sample utterances.

Examples of sample utterances generated by the GPT-3 autoregressive generative language models are provided below. For example, within a "Banking" domain, the input examples included: "send 2000 dollars between chase and rabobank accounts"; "move money from one account to another"; and "money transfer request". For this example, two higher-value generated sample utterances included: "transfer between two accounts", and "need to send half a million dollars from a bank to a broker firm"; while lower-value generated sample utterances included: "to send some money from dtrusts to b of a". In another example, within a "Home" domain, the input examples included: "take carrots off my list for shopping"; "i'm out of bananas; add to shopping list"; and "add soda to my shopping list". For this example, two higher-value generated sample utterances included: "i'm out of kleenex will you add that to the shopping list", and "take batteries off my shopping list"; while lower-value generated sample utterances included: "my shopping list has no item on it that begins with 'c' please". In another example, within a "Small talk" domain, the input examples included: "what is life's meaning"; "what's the point of this dumpster fire known as life"; and "whats your take on the meaning of life". For this example, two higher-value generated sample utterances included: "can you tell me life's meaning", and "should we try to figure out why we exist"; while lower-value generated sample utterances included: "how do you ask . . . ".

Example: Evaluation

For this example, the performance of the intent classifier 304 was evaluated after three different training or fine-tuning scenarios of the BERT-large encoder language model. The first training scenario provided a baseline that demonstrated the performance of the intent classifier 304 when the BERT-large encoder language model was fine-tuned on $D_F \cup D_M$ without augmentation. The second training scenario was an upsample scenario that demonstrated the performance of the intent classifier 304 when the BERT-large encoder language model was fine-tuned on $D_F \cup D_M$ without augmentation, but where $D_F$ was upsampled to match the many-shot frequencies of $D_M$. The third training scenario corresponds to the present data augmentation technique and demonstrated the performance of the intent classifier 304 when the BERT-large encoder language model was fine-tuned on the augmented training data $(\tilde{D} \cup D_M)$. For each scenario, an overall in-scope accuracy score, and an overall out-of-scope (OOS) recall score, and a few shot accuracy score was determined using the official test set of the CLINC150 dataset, averaged across 10 held-out domains.

Table 1 presents the results of these experiments using the official test set of the CLINC150 dataset. The entries in Table 1 for "BERT baseline" and "BERT upsample" respectively correspond to the first and second training scenarios described above. The "BERT augmented" entries of Table 1 correspond to the third training scenario described above, in which the training dataset was augmented using the present technique using different GPT-3 autoregressive generative language models (i.e., Ada, Babbage, Curie, and Davinci) without fine-tuning. By augmenting the training data of the CLINC150 dataset with GPT-3 generated samples, after fine-tuning, the encoder language model 310 of the intent classifier 304 demonstrated a substantial accuracy boost (e.g., up to 2.7% for few-shot), as compared to the "BERT baseline" entry or the "BERT upsample" entries.

TABLE 1

Intent classification results on the CLINC150 dataset.

| | CLINIC150 | | |
|---|---|---|---|
| | Overall | | |
| | In-scope Accuracy | Out-of-Scope Recall | Few-shot Accuracy |
| BERT baseline | 96.28 | 39.14 | 91.36 |
| BERT upsample | 96.20 | 40.21 | 90.93 |
| BERT Augmented GPT3ada | 96.09 | 33.30 | 92.20 |
| BERT Augmented GPT3babbage | 96.15 | 33.17 | 92.41 |
| BERT Augmented GPT3curie | 96.36 | 34.90 | 93.43 |
| BERT Augmented GPT3davinci | 96.45 | 35.55 | 94.06 |

The technical effects of the present disclosure include improving the performance of intent classifiers for applications in which intent samples are limited and insufficient to perform fine-tuning. Given a small initial dataset for intent classification consisting of few examples per intent, the disclosed augmentation system and method synthetically augments the initial intent classification dataset, which, when used to train an intent classifier, improves the performance of the intent classifier. The present approach generally casts the problem of generating new samples as a few-shot task and leverages the few-shot abilities of large pre-trained autoregressive generative language models (e.g., GPT-3) without fine-tuning to solve the task by prompting. Additionally, when reduced to actual practice, this technique improves the performance of intent classifiers, especially for few-shot intent classification. Furthermore, it was unexpectedly observed that the disclosed data augmentation technique offers superior performance compared to sampling from a fine-tuned encoder language model, despite substantially less task-specific data being used.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
at least one memory configured to store a pre-trained autoregressive generative language model without fine-tuning, an encoder language model defining intents and trained to classify which of the intents are expressed in received natural language utterances, and an intent classification dataset having initial intent samples for each of the intents of the encoder language model; and
at least one processor configured to execute stored instructions to cause the computing system to perform actions comprising:
selecting a set of initial intent samples from the intent classification dataset, wherein the set of initial intent samples is associated with at least one intent of the encoder language model;
providing the set of initial intent samples as input to the pre-trained autoregressive generative language model;
receiving a set of generated intent samples associated with the at least one intent as output from the pre-trained autoregressive generative language model;
adding at least a portion of the set of generated intent samples associated with the at least one intent to the intent classification dataset to yield an augmented intent classification dataset; and
fine-tuning the encoder language model using the augmented intent classification dataset.

2. The computing system of claim 1, wherein the intent classification dataset is a human-authored dataset.

3. The computing system of claim 1, wherein the set of initial intent samples are associated with a single intent of the encoder language model, and wherein providing the set of initial intent samples as input to the pre-trained autoregressive generative language model comprises performing single-intent prompting of the pre-trained autoregressive generative language model.

4. The computing system of claim 1, wherein the set of initial intent samples are associated with multiple intents of the encoder language model, and wherein providing the set of initial intent samples as input to the pre-trained autoregressive generative language model comprises performing multi-intent prompting of the pre-trained autoregressive generative language model.

5. The computing system of claim 4, wherein the portion of the set of generated intent samples added to the intent classification dataset are associated with each of the multiple intents of the encoder language model.

6. The computing system of claim 1, wherein, to provide the set of initial intent samples as input to the pre-trained autoregressive generative language model, the at least one processor is configured to execute the stored instructions to cause the computing system to perform actions comprising:
concatenating the set of initial intent samples into a delineated string that is provided as input to the pre-trained autoregressive generative language model.

7. The computing system of claim 1, wherein the at least one memory is configured to store an adaptive learning component, and wherein, to add at least the portion of the set of generated intent samples to the intent classification dataset, the at least one processor is configured to execute the stored instructions to cause the computing system to perform actions comprising:
applying the adaptive learning component to the set of generated intent samples to identify intent samples of interest from the set of generated intent samples;
providing the intent samples of interest to a human reviewer;
receiving modified intent samples of interest from the human reviewer; and
adding the modified intent samples of interest to the intent classification dataset.

8. The computing system of claim 7, wherein, to identify the intent samples of interest from the set of generated intent samples, the at least one processor is configured to execute the stored instructions to cause the computing system to perform actions comprising:
identifying, via the adaptive learning component, the intent samples of interest as likely to be high-value intent samples, as likely to have grammar or intent labeling issues, or any combination thereof.

9. The computing system of claim 1, wherein, before selecting the set of initial intent samples, the at least one processor is configured to execute the stored instructions to cause the computing system to perform actions comprising:
determining that intent classification dataset includes less than a predetermined number of initial intent samples associated with the at least one intent, or
receiving a request to augment the initial intent samples of the intent classification dataset associated with the at least one intent, or
determining, based on a pre-determined schedule, that the initial intent samples of the intent classification dataset should be augmented associated with the at least one intent.

10. The computing system of claim 1, wherein the encoder language model comprises a Bidirectional Encoder Representations from Transformers (BERT) model.

11. The computing system of claim 1, wherein the pre-trained autoregressive generative language model comprises a third generation generative pre-trained transformer (GPT-3) model without fine-tuning.

12. A method, comprising:
selecting a set of initial intent samples from an intent classification dataset that includes initial intent samples for each of intent of a encoder language model, wherein the encoder language model defines intents and is trained to classify which of the intents are expressed in received natural language utterances, and wherein the set of initial intent samples is associated with at least one intent of the encoder language model;
providing the set of initial intent samples as input to a pre-trained autoregressive generative language model that lacks fine-tuning;
receiving a set of generated intent samples associated with the at least one intent as output from the pre-trained autoregressive generative language model;
adding at least a portion of the set of generated intent samples associated with the at least one intent to the intent classification dataset to yield an augmented intent classification dataset; and
fine-tuning the encoder language model using the augmented intent classification dataset.

13. The method of claim 12, wherein, before selecting the set of initial intent samples, the method comprises:
determining that intent classification dataset includes less than a predetermined number of initial intent samples associated with the at least one intent, or
receiving a request to augment the initial intent samples of the intent classification dataset associated with the at least one intent, or
determining, based on a pre-determined schedule, that the initial intent samples of the intent classification dataset should be augmented associated with the at least one intent.

14. The method of claim 12, wherein the set of initial intent samples are associated with multiple intents of the encoder language model, wherein providing the set of initial intent samples as input to the pre-trained autoregressive generative language model comprises performing multi-intent prompting of the pre-trained autoregressive generative language model, and wherein the portion of the set of generated intent samples added to the intent classification dataset are associated with at least one of the multiple intents of the encoder language model.

15. The method of claim 12, wherein adding at least the portion of the set of generated intent samples to the intent classification dataset comprises:
applying an adaptive learning component to the set of generated intent samples to identify intent samples of interest from the set of generated intent samples, wherein the intent samples of interest are determined to likely be high-value intent samples, to likely include grammar or intent labeling issues, or any combination thereof;
providing the intent samples of interest to a human reviewer;
receiving modified intent samples of interest from the human reviewer; and
adding the modified intent samples of interest to the intent classification dataset.

16. The method of claim 12, wherein the encoder language model comprises a Bidirectional Encoder Representations from Transformers (BERT) model, and the pre-trained autoregressive generative language model comprises a third generation generative pre-trained transformer (GPT-3) model without fine-tuning.

17. A non-transitory, computer-readable medium storing instructions executable by a computer processor, the instructions comprising instructions to:
- select a set of initial intent samples from an intent classification dataset that includes initial intent samples for each of intent of a encoder language model, wherein the encoder language model defines intents and is trained to classify which of the intents are expressed in received natural language utterances, and wherein the set of initial intent samples is associated with at least one intent of the encoder language model;
- provide the set of initial intent samples as input to a pre-trained autoregressive generative language model that lacks fine-tuning;
- receive a set of generated intent samples associated with the at least one intent as output from the pre-trained autoregressive generative language model;
- add at least a portion of the set of generated intent samples associated with the at least one intent to the intent classification dataset to yield an augmented intent classification dataset; and
- fine-tune the encoder language model using the augmented intent classification dataset.

18. The non-transitory, computer-readable medium of claim 17, wherein, before the instructions to select the set of initial intent samples, the instructions comprise instructions to:
- determine that intent classification dataset includes less than a predetermined number of initial intent samples associated with the at least one intent, or
- receive a request to augment the initial intent samples of the intent classification dataset associated with the at least one intent, or
- determine, based on a pre-determined schedule, that the initial intent samples of the intent classification dataset should be augmented associated with the at least one intent.

19. The non-transitory, computer-readable medium of claim 17, wherein the instructions to add at least the portion of the set of generated intent samples to the intent classification dataset comprise instructions to:
- apply an adaptive learning component to the set of generated intent samples to identify intent samples of interest from the set of generated intent samples, wherein the intent samples of interest are determined to likely be high-value intent samples, to likely include grammar or intent labeling issues, or any combination thereof;
- provide the intent samples of interest to a human reviewer;
- receive modified intent samples of interest from the human reviewer; and
- add the modified intent samples of interest to the intent classification dataset.

20. The non-transitory, computer-readable medium of claim 17, wherein the encoder language model comprises a Bidirectional Encoder Representations from Transformers (BERT) model, and the pre-trained autoregressive generative language model comprises a third generation generative pre-trained transformer (GPT-3) model without fine-tuning.

* * * * *